(12) United States Patent
Hsieh et al.

(10) Patent No.: US 10,437,417 B2
(45) Date of Patent: Oct. 8, 2019

(54) COMPUTER-IMPLEMENTED METHOD FOR DISPLAYING RECEPTION STATUS OF BEACON ON ELECTRONIC MAP

(71) Applicant: Kinpo Electronics, Inc., New Taipei (TW)

(72) Inventors: Tung-Yun Hsieh, New Taipei (TW); Sheng-Chih Hsu, New Taipei (TW); Chuan-Kai Lin, New Taipei (TW); Yu-Lun Ting, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 335 days.

(21) Appl. No.: 15/146,895

(22) Filed: May 5, 2016

(65) Prior Publication Data
US 2017/0255360 A1    Sep. 7, 2017

(30) Foreign Application Priority Data
Mar. 3, 2016  (TW) .............................. 105106469 A

(51) Int. Cl.
*G06F 3/048*     (2013.01)
*G06F 3/0481*    (2013.01)
(Continued)

(52) U.S. Cl.
CPC ........ *G06F 3/04817* (2013.01); *G06F 3/0486* (2013.01); *G06T 11/001* (2013.01);
(Continued)

(58) Field of Classification Search
CPC .................................................. G06F 3/04817
See application file for complete search history.

(56) References Cited

U.S. PATENT DOCUMENTS

| 4,949,268 A | 8/1990 | Nishikawa et al. |
| 2001/0047229 A1* | 11/2001 | Staggs ................. G01C 23/005 701/3 |

(Continued)

FOREIGN PATENT DOCUMENTS

| CN | 102141407 | 8/2011 |
| CN | 102483451 | 5/2012 |

(Continued)

OTHER PUBLICATIONS

Jongdae Jung et al., "Indoor localization using particle filter and map-based NLOS ranging model," 2011 IEEE International Conference on Robotics and Automation (ICRA), May 2011, pp. 5185-5190.

(Continued)

*Primary Examiner* — Jennifer N To
*Assistant Examiner* — Ashley M Fortino
(74) *Attorney, Agent, or Firm* — JCIPRNET

(57) ABSTRACT

A computer-implemented method for displaying a reception status of a beacon on an electronic map is provided. The electronic map is loaded and displayed. A location of the beacon located on the electronic map is determined to obtain a location data. A signal region corresponding to a signal intensity range of the beacon located on the electronic map is determined based on the location data. A line of sight (LOS) region and a non line of sight (NLOS) region of the beacon corresponding to an obstruction information on the electronic map are determined based on the location data. A cartographic drawing is executed and displayed on the electronic map based on the signal region, the LOS region and the NLOS region.

7 Claims, 7 Drawing Sheets

(51) Int. Cl.
*G06F 3/0486* (2013.01)
*G06T 11/00* (2006.01)
*H04W 16/20* (2009.01)
*H04W 64/00* (2009.01)

(52) U.S. Cl.
CPC ......... *H04W 16/20* (2013.01); *H04W 64/003* (2013.01); *G06T 2200/24* (2013.01)

(56) References Cited

U.S. PATENT DOCUMENTS

| | | | |
|---|---|---|---|
| 2007/0204218 A1* | 8/2007 | Weber | G01C 21/20 715/234 |
| 2009/0023459 A1 | 1/2009 | Wigren | |
| 2017/0026345 A1* | 1/2017 | Salek | H04L 63/0428 |

FOREIGN PATENT DOCUMENTS

| | | |
|---|---|---|
| TW | 201427461 | 7/2014 |
| WO | 2014089531 | 6/2014 |
| WO | 2015057376 | 4/2015 |

OTHER PUBLICATIONS

"Search Report of Europe Counterpart Application", dated Aug. 3, 2017, p. 1-p. 10, in which the listed references were cited.
"Office Action of Taiwan Counterpart Application," dated Apr. 21, 2017, p. 1-p. 6, in which the listed references were cited.

* cited by examiner

COMPUTER-IMPLEMENTED METHOD FOR DISPLAYING RECEPTION STATUS OF BEACON ON ELECTRONIC MAP

CROSS-REFERENCE TO RELATED APPLICATION

This application claims the priority benefit of Taiwan application serial no. 105106469, filed on Mar. 3, 2016. The entirety of the above-mentioned patent application is hereby incorporated by reference herein and made a part of this specification.

BACKGROUND OF THE INVENTION

Field of the Invention

The invention relates to a method for displaying a reception status, and particularly relates to a computer-implemented method for displaying a reception status of a beacon on an electronic map.

Description of Related Art

Generally, a global positioning system (GPS) with a wide coverage range is adopted to implement positioning outdoors. However, when a user enters a building, the positioning system adapted to be used outdoors such as the GPS cannot function normally due to influence on signals cause by indoor obstructions. Therefore, an indoor positioning system is provided. The existing indoor positioning techniques include a wireless network positioning technique, a radio frequency identification (RFID) positioning technique, an infrared positioning technique, etc.

SUMMARY OF THE INVENTION

The invention is directed to a computer-implemented method for displaying reception status of beacon on an electronic map, which is capable of pre-simulating a reception status, of a beacon to be configured on an electronic map in a specific space, so as to save a time required for implementing multiple deployments.

The invention provides a computer-implemented method for displaying a reception status of a beacon on an electronic map, and the method include following steps implemented by a computer processor. The electronic map is loaded and displayed, where the electronic map has at least one obstruction information. A location of the beacon located on the electronic map is determined to obtain a location data. A signal region corresponding to a signal intensity range of the beacon on the electronic map is determined based on the location data. A line of sight (LOS) region and a non line of sight (NLOS) region of the beacon corresponding to the obstruction information on the electronic map are determined based on the location data. A cartographic drawing is executed and displayed on the electronic map based on the signal region, the LOS region and the NLOS region.

In an embodiment of the invention, after the step of determining the signal region corresponding to the signal intensity range of the beacon on the electronic map, the method further includes adjusting a precision threshold to determine a precision of the signal region.

In an embodiment of the invention, the step of executing the cartographic drawing based on the signal region, the LOS region and the NLOS region includes determining an intersection region between the signal region and the LOS region to obtain an overlapped region.

In an embodiment of the invention, the number of the beacon is plural, and the method further includes following steps. Locations of the beacons respectively located on the electronic map are determined to obtain a plurality of location data. Signal regions corresponding to respective signal intensity ranges of the beacons on the electronic map are determined based on the plurality of location data. LOS regions and NLOS regions of the beacons respectively corresponding to the obstruction information on the electronic map are determined based on the plurality of location data. A plurality of overlapped regions is obtained according to the signal regions, the LOS regions and the NLOS regions respectively corresponding to the beacons on the electronic map. A signal level corresponding to each of the overlapped regions is set according to at least one of the signal regions, the LOS regions and the NLOS regions included in the overlapped regions.

In an embodiment of the invention, after the step of setting the signal level corresponding to each of the overlapped regions, the method further includes displaying a signal intensity distribution diagram according to the signal level, where the signal intensity distribution diagram is displayed in different colors based on the signal level.

In an embodiment of the invention, the step of determining the LOS region and the NLOS region of the beacon corresponding to the obstruction information on the electronic map based on the location data includes determining whether at least one obstruction exists on a straight line transmission path of the beacon on the electronic map based on the obstruction information, so as to obtain the LOS region and the NLOS region of the beacon on the electronic map.

In an embodiment of the invention, the method further includes followings steps. A display interface is provided, and the electronic map is loaded and displayed in the display interface. After the location of the beacon on the electronic map is determined, a device icon, an identification code and coordinate values corresponding to the beacon are displayed on the electronic map. The display interface provides a dragging function and an input function. When the dragging function is triggered, a dragging operation is performed on the device icon according to a dragging command. Moreover, the location data of the beacon is received through the input function, and the corresponding device icon is displayed on the electronic map according to the location data.

In an embodiment of the invention, the method further includes followings steps. When a resetting function on the display interface is enabled, the device icon of the beacon on the electronic map is reset, and a location of the beacon on the electronic map is re-determined, so as to obtain the location information to re-execute the cartographic drawing.

According to the above descriptions, before carrying out the actual configuration, the number and locations of the beacons to be configured are simulated, by which not only the time required for multiple actual configurations is saved, but also an unexpected installation error is avoided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally, it has to rely on satellites to implement today's positioning and navigation of a global positioning system (GPS). However, satellite signals sometimes cannot be received due to shielding of obstructions, for example, at an airport, in a building, an underpass or a tunnel, etc., it is very likely unable to correctly carry out positioning due to that the satellite signals cannot be received. Therefore, in order to resolve the problem that the GPS cannot be used for positioning in indoor spaces, a following method is adopted, i.e. a plurality of beacons is set indoors, and a robot may automatically move in the indoor space. The beacons are, for example, devices respectively having a wireless signal transmitter, and the automatic control device such as the robot, etc., is a device having a wireless signal receiver. In order to accurately control an operation of the robot, it is required to set the beacons according to different sites. According to the invention, a signal intensity distribution of one or a plurality of beacons to be configured in a specific space is pre-simulated to save a time required for carrying out multiple actual deployments. In order to fully convey the spirit of the invention, embodiments of the invention are provided below for further description.

Figure 1A:
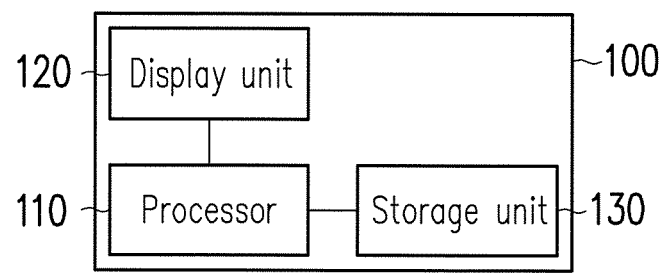
FIG. 1A is a block diagram of an electronic device according to an embodiment of the invention.
Figure 1B:
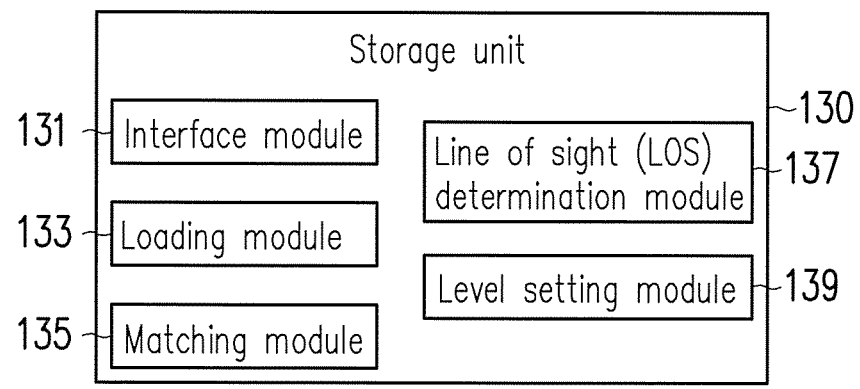
FIG. 1B is a block diagram of a structure of a storage unit according to an embodiment of the invention.

FIG. 1A is a block diagram of an electronic device according to an embodiment of the invention. FIG. 1B is a block diagram of a structure of a storage unit according to an embodiment of the invention. Referring to FIG. 1A, the electronic device 100 is a device having a computation capability, for example, a smart phone, a tablet personal computer (PC), a notebook, a PC, a server, etc. The electronic device 100 includes a processor 110, a display unit 120 and a storage unit 130. The processor 110 is coupled to the display unit 120 and the storage unit 130.

The processor 110 is, for example, a central processing unit (CPU), a graphic processing unit (GPU), a physics processing unit (PPU), a programmable microprocessor, an embedded control chip, a digital signal processor (DSP), application specific integrated circuits (ASIC) or other similar devices.

The display unit 120 can be any type of display, for example, a liquid crystal display (LCD), a light emitting diode (LED) display or a flexible display.

The storage unit 130 is, for example any type of a fixed or movable random access memory (RAM), a read-only memory (ROM), a flash memory, a hard disc or other similar device or a combination of the devices.

The storage unit 130 includes a plurality of modules respectively composed of one or a plurality of program instructions, and the processor 110 executes the aforementioned modules to respectively enable a plurality of functions to implement a computer-implemented method for displaying a reception status of a beacon on an electronic map. An embodiment is provided below to describe the modules included in the storage unit 130, though the following modules are only used as an example, and the invention is not limited thereto.

Referring to FIG. 1B, the storage unit 130 includes an interface module 131, a loading module 133, a matching module 135, a line of sight (LOS) determination module 137 and a level setting module 139.

The interface module 131 is used for providing a display interface to the display unit 120. The loading module 133 is used for loading and displaying an electronic map to the display unit 120. Namely, the loading module 133 loads the electronic map corresponding to a space to the display interface according to user's selection.

The matching module 135 determines a location of a beacon located on the electronic map to obtain location data, and determines a signal region corresponding to a signal intensity range of the beacon on the electronic map based on the location data. The signal intensity range is, for example, a dilution of precision (DOP) range. Each of the beacons has one DOP range. The DOP is a term used in satellite navigation and geomatics engineering. A DOP value can be used for describing a positioning error, and is generally applied in the GPS. The smaller the DOP value is, the higher the positioning precision is.

After the location data of the beacon on the electronic map is determined, a coordinate position of the beacon on the electronic map is taken as a center to match the signal intensity range (for example, the DOP range) and the electronic map, so as to obtain the corresponding signal region on the electronic map.

The LOS determination module 137 obtains a LOS region and a non line of sight (NLOS) region of each of the beacons on the electronic map based on obstruction information of the electronic map. Namely, the LOS determination module 137 determines whether at least one obstruction exists on a straight line transmission path of each of the beacons on the electronic map based on the obstruction information, so as to obtain the LOS region and the NLOS region of each of the beacons on the electronic map.

Further, if at least one obstruction exists on the straight line transmission path of each of the beacons on the electronic map, the region blocked by the obstruction on the straight line transmission path is determined as the NLOS region. If none obstruction exists on the straight line transmission path of the beacon on the electronic map, the LOS region is determined. Namely, "LOS" refers to that none obstruction exists between two points, and "NLOS" refers to that an obstruction exists between two the points.

The level setting module 139 is selectively set, and is used for setting a signal level. For example, the higher the signal level is, the lesser the regions where the signals reach a threshold are, and the lower the signal level is, the more the regions where the signals reach the threshold are.

Figure 2A:
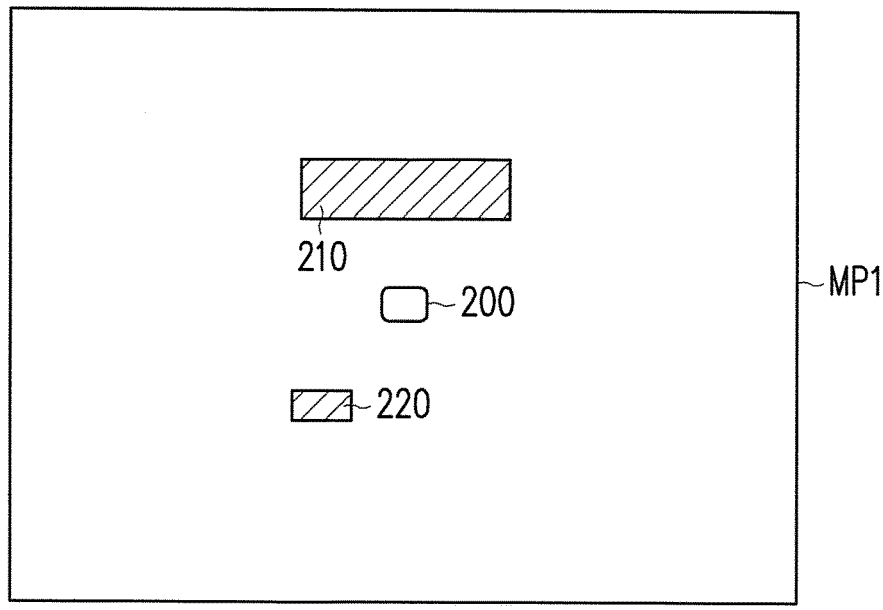
FIG. 2A-FIG. 2D are schematic diagrams of matching an electronic map according to an embodiment of the invention.
Figure 2B:
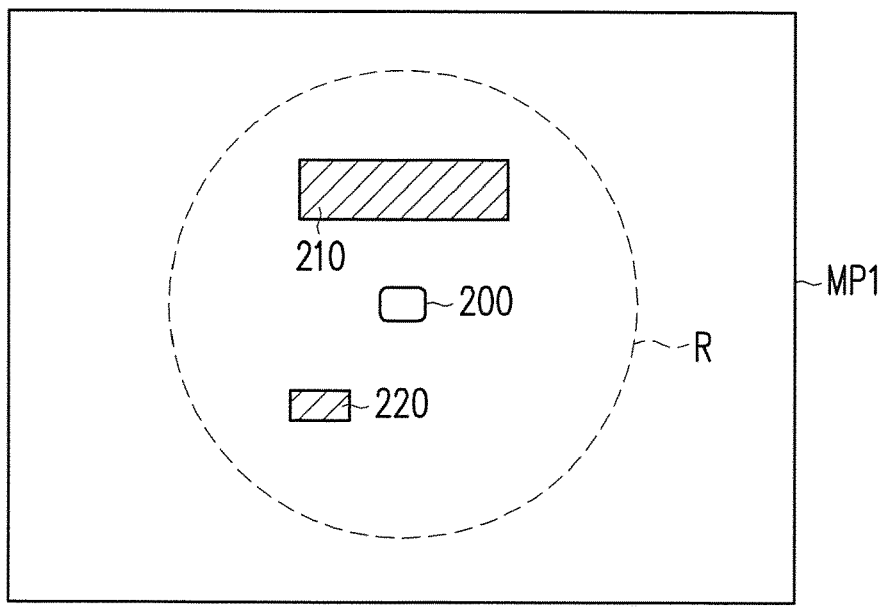
Figure 2C:
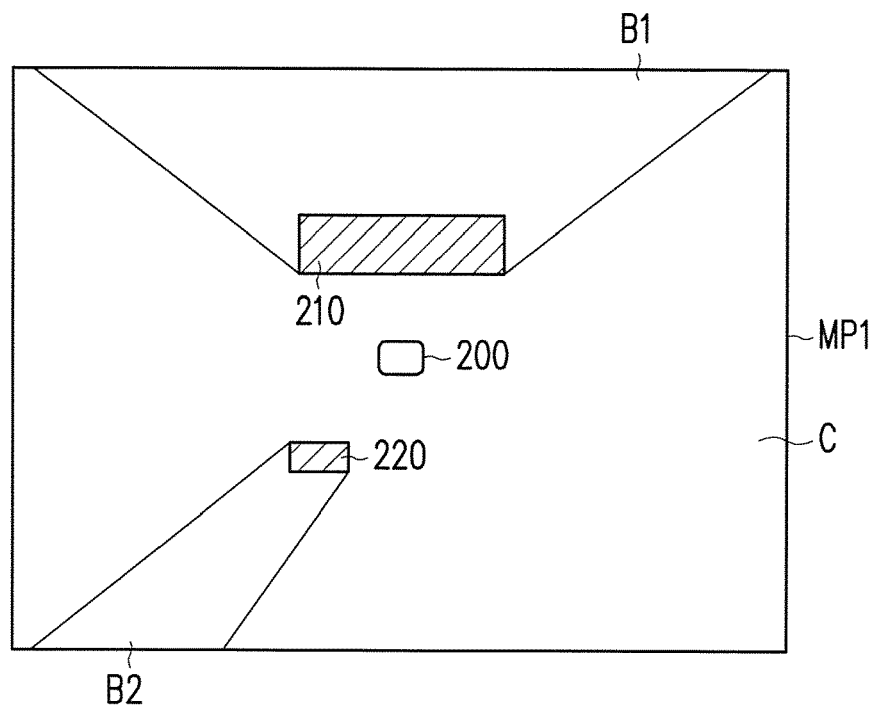
Figure 2D:
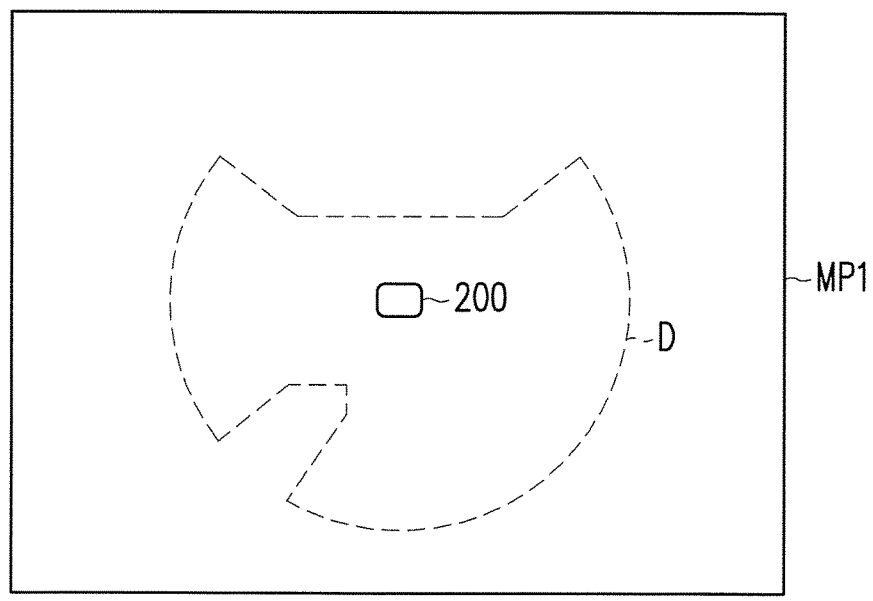
Figure 3:
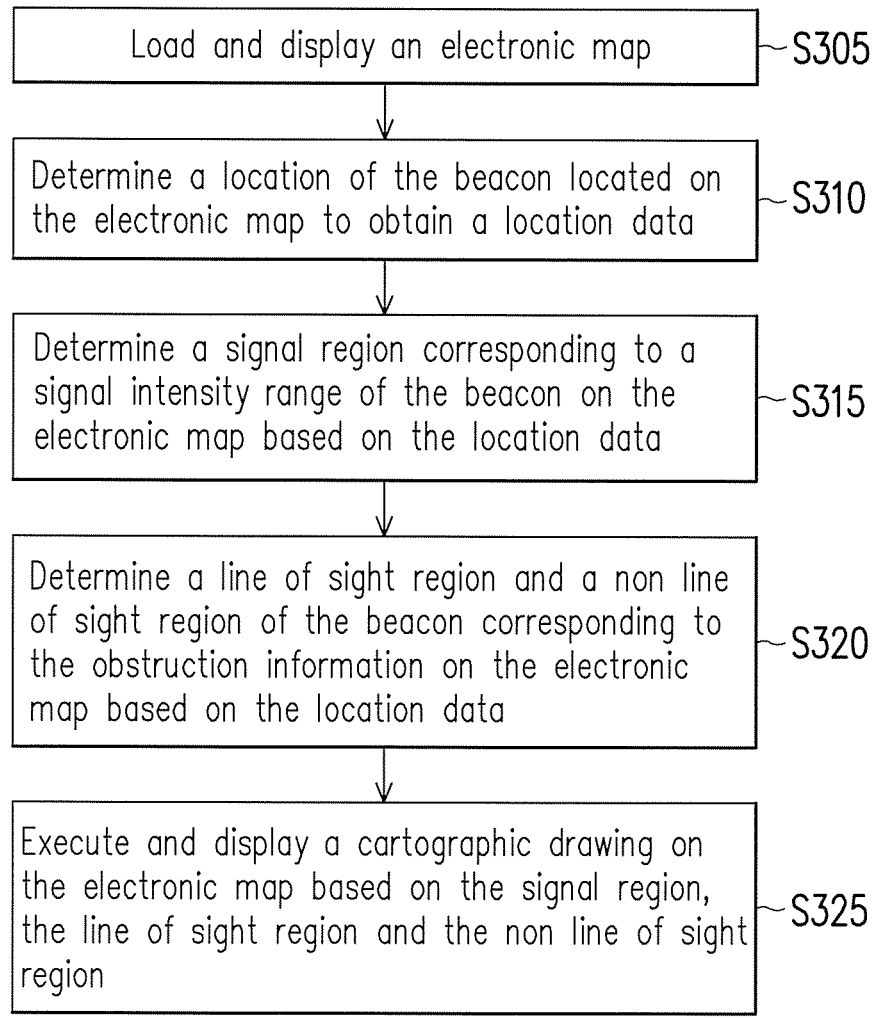
FIG. 3 is a flowchart illustrating a computer-implemented method for displaying a reception status of a beacon on an electronic map according to an embodiment of the invention.

FIG. 2A-FIG. 2D are schematic diagrams of displaying a reception status of a beacon on an electronic map according to an embodiment of the invention. FIG. 3 is a flowchart illustrating a computer-implemented method for displaying a reception status of a beacon on an electronic map according to an embodiment of the invention. In the present embodiment, matching of a beacon 200 on an electronic map MP1 is taken as an example for description.

Referring to FIG. 3, in step S305, the loading module 133 loads and displays the electronic map MP1 corresponding to a selected space on the display unit 120. The electronic map MP1 has at least one obstruction information. The obstruction information includes a setting position of a wall or a separator, a setting position of a giant object. As shown in FIG. 2A, the electronic map MP1 includes obstructions 210 and 220.

Then, in step S310, the matching module 135 determines a location of the beacon 200 located on the electronic map MP1 to obtain location data. Here, the beacon 200 can be automatically set, or manually set by the user. Moreover, in step S315, a signal region corresponding to a signal intensity range of the beacon 200 on the electronic map MP1 is determined based on the location data, i.e. a signal region R shown in FIG. 2B.

In step S320, the LOS determination module 137 determines a LOS region and a NLOS region of the beacon 200 corresponding to the obstruction information on the electronic map MP1 based on the location data. Namely, after analysis of the LOS determination module 137, the electronic map MP1 shown in FIG. 2C is obtained. To be specific, the electronic map MP1 has the obstructions 210 and 220, and the LOS determination module 137 obtains a LOS region C and a NLOS region B1 and a NLOS region B2 corresponding to the beacon 200 on the electronic map MP1.

After the signal region R, the LOS region C and the NLOS regions B1-B2 are obtained, in step S325, the matching module 135 executes and displays a cartographic drawing on the electronic map MP1 based on the signal region R, the LOS region C and the NLOS regions B1-B2. For example, as shown in FIG. 2D, the matching module 135 may further determines an intersection region between the signal region R and the LOS region C to obtain an overlapped region D. Namely, in the overlapped region D, a reception status of the beacon 200 is the best.

Moreover, in case of two beacons, the signal region, the LOS region C and the NLOS regions of each beacon can also be respectively obtained according to the embodiment of FIG. 2A-FIG. 2D, and then one or a plurality of overlapped regions is obtained according to intersection parts of the aforementioned regions.

In case that a plurality of overlapped regions is obtained, the level setting module 139 can be used to set a signal level corresponding to each of the overlapped regions according to at least one of the signal regions, the LOS regions and the NLOS regions included in the overlapped regions. For example, in case that the overlapped region does not include the signal region of any beacon, the level setting module 139 sets the signal level of the overlapped region to be the lowest. In case that the overlapped region includes the signal region of any beacon, the signal level is set according to the number of the signal regions and the number of the LOS regions included in the overlapped region. Namely, the more the number of the signals regions and the number of the LOS region included in the overlapped region are, the higher the corresponding signal level thereof is.

Moreover, after the signal region corresponding to the signal intensity range on the electronic map is obtained, the matching module 135 can be used to adjust a precision threshold to determine a precision of the signal region. One receiver may obtain signals sent by a plurality of beacons at a same time. A good receiver may determine how to capture reliable signals from the wireless signals to perform computation. In the signals selected by the receiver, if a distance between two beacons is too close, the signal intensity ranges of the two beacons have an overlapped region, and the closer the distance is, the greater the overlapped region is, and the greater the error that influences the precision is. The precision threshold is used for determining a precision of the signal intensity range. For example, the greater the precision threshold is, the higher the precision is (the smaller the error is), and the smaller the range corresponding to the signal region on the electronic map is; while the smaller the precision threshold is, the lower the precision is (the greater the error is), and the greater the range corresponding to the signal region on the electronic map is.

Figure 4:
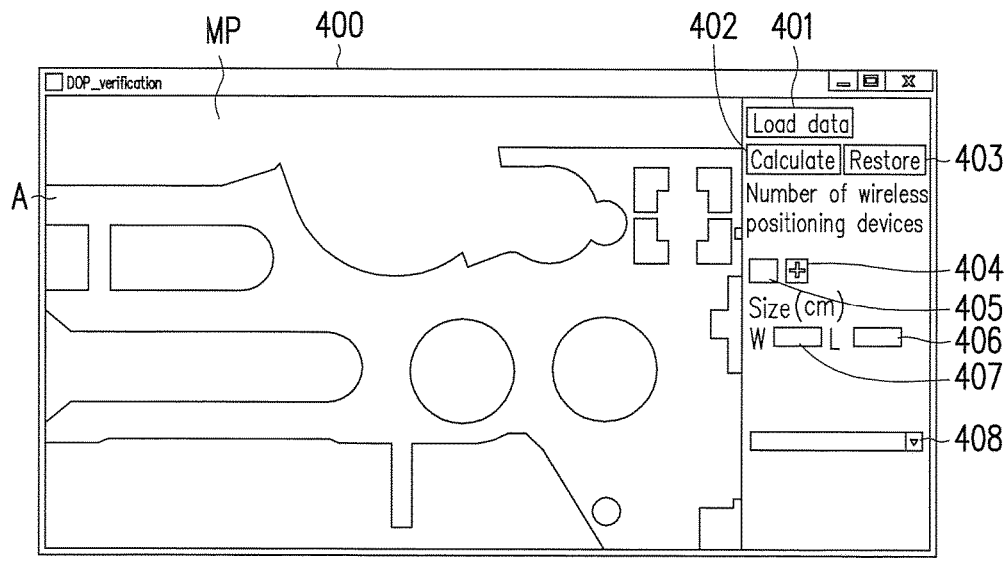
FIG. 4 is a schematic diagram of a display interface according to an embodiment of the invention.

The method for displaying reception statuses of a plurality of beacons on the electronic map is described below with reference of the electronic device 100. FIG. 4 is a schematic diagram of a display interface according to an embodiment of the invention. In the present embodiment, a plurality of beacons is configured in a space, and the processor 110 calculates signal intensity distributions of the beacons in the space to determine a configuration position of each beacon in the space, so as to facilitate a robot to move in the space. The interface module 131 provides a display interface 400 in the display unit 120.

First, the loading module 133 loads an electronic map MP corresponding to a selected space to the display interface 400 according to user's selection. In FIG. 4, a walkable region A of the electronic map MP represents a region where an automatic control device such as a robot can freely move.

The display interface 400 includes a plurality of operation functions 401-404, a plurality of input fields 405-407 and a pull-down page 408. The operation function 401 is used for loading a previously stored record file, where the record file is used for storing placement information (for example, the number, coordinate values of placement locations in the electronic map) of the beacons. The operation function 402 is a calculation button, which is used for calculating the signal intensity distributions of the beacons after the beacons are set. Namely, when the operation function 402 is enabled (for example, clicked), the matching module 135, the LOG determination module 137 and the level setting module 139 are driven to perform subsequent operations.

The operation function 403 is used for restoring a previous setting. The operation function 404 is used for increasing the number of the beacons to be placed. The input fields 405 and 406 provide the user to input a size of an actual space corresponding to the electronic map MP in a unit of centimeter, where the input field 405 is used for inputting a width, and the input field 406 is used for inputting a length. The pull-down page 408 is used for displaying coordinate values of each of the beacons set in the electronic map MP.

After the electronic map MP is loaded, the matching module 135 sets a plurality of beacons on the electronic map MP according to location data of the beacons received according to a plurality of selection commands. In other embodiments, the matching module 135 may also automatically determine the location data of the beacons, which is not limited by the invention.

Figure 5:
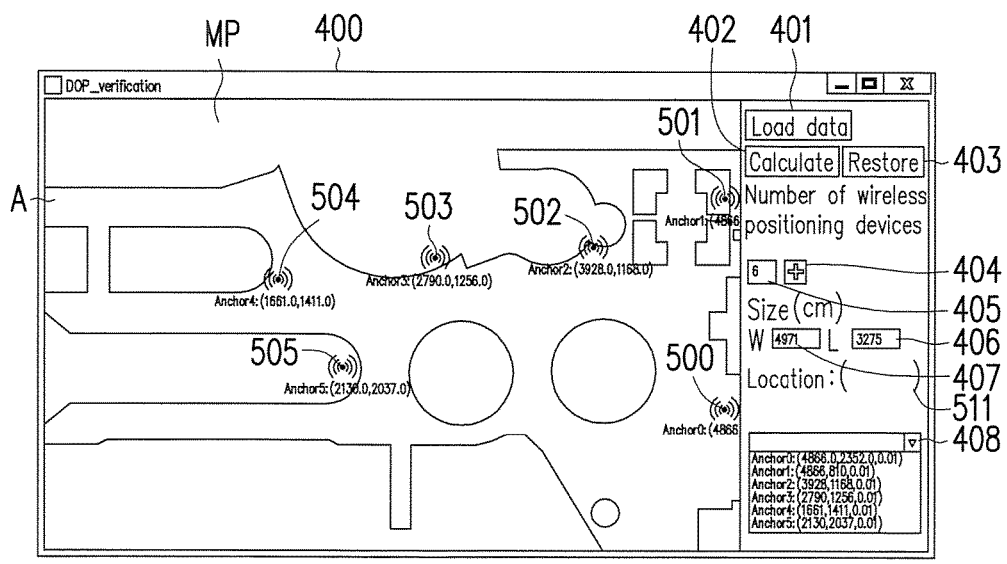
FIG. 5 is a schematic diagram of setting beacons according to an embodiment of the invention.

FIG. 5 is a schematic diagram of setting the beacons according to an embodiment of the invention. Referring to FIG. 5, the matching module 135 sets six beacons on the electronic map MP. In the present embodiment, when any beacon is set on the electronic map MP, device icons 500-505, identification codes and coordinate values corresponding to the set beacon are all displayed. Here, the coordinate values (including values corresponding to X, Y, Z axes) of the device icons 500-505 are displayed in the pull-down page 408. Taking the device icon 500 as an example, the identification code thereof is Anchor0, and the coordinate values thereof are (4866.0, 2352.0, 0.01).

Moreover, the display interface 400 further provides a dragging function and an input function. The provided input function is an input field 511. When the dragging function is triggered, a dragging operation is performed on the device icon according to a dragging command. For example, after one device icon is selected, a left button of a mouse is pressed and held to trigger the driving function, so as to input a dragging command to drag the device icon to a desired location. The input field 511 is used for receiving the location data of the beacon, and the corresponding device icon is displayed on the electronic map MP according to the location data. For example, after one of the device icons is selected, location setting of the device icon is directly performed through the input field 511. Alternatively, in case that none of the device icon is selected, the coordinate values can be directly input to the input field 511 to directly add a device icon of a beacon on the electronic map MP.

After the location data of the beacon is obtained, the matching module 135 determines the signal region corresponding to the signal intensity range of each beacon on the electronic map MP according to a plurality of location data of the beacons. For example, a coordinate position of each beacon on the electronic map MP is taken as a center to match the signal intensity range and the electronic map, so as to obtain the corresponding signal region on the electronic map MP.

Figure 6A:
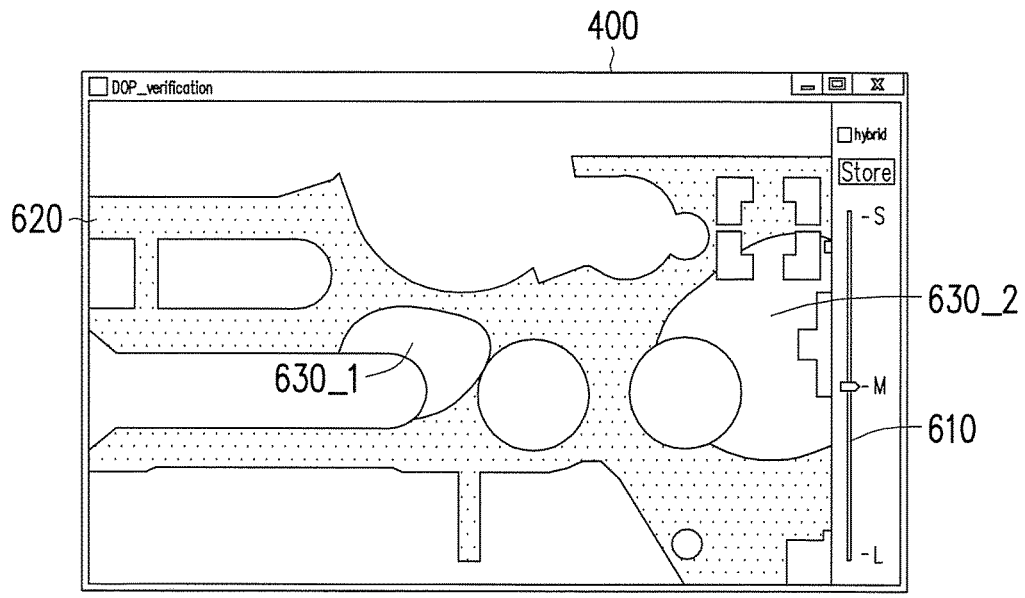
FIG. 6A and FIG. 6B are schematic diagrams of signal intensity distributions based on dilution of precision (DOP) according to an embodiment of the invention.
Figure 6B:
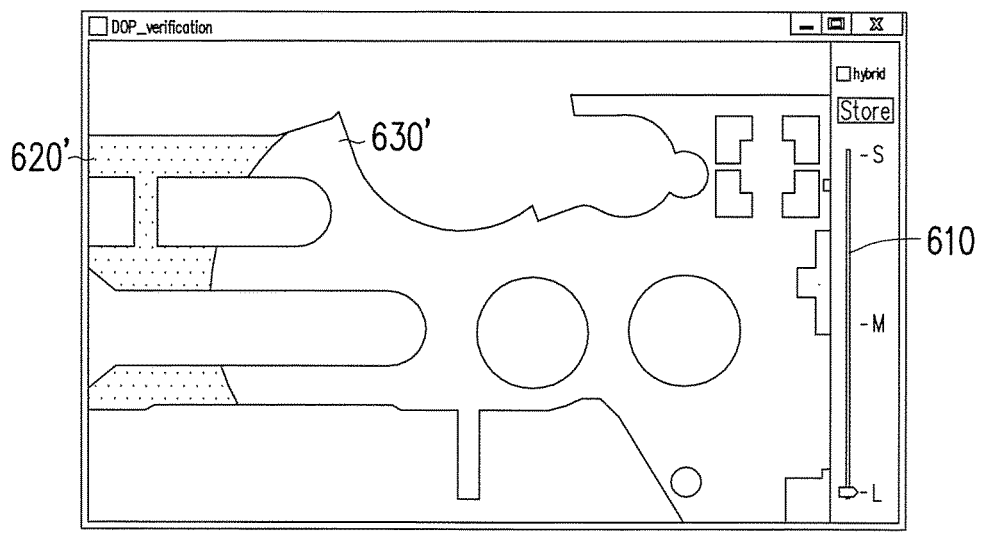

Moreover, the display interface 400 further provides a precision adjusting function. For example, FIG. 6A and FIG. 6B are schematic diagrams of signal intensity distributions based on DOP according to an embodiment of the invention. Referring to FIG. 6A and FIG. 6B, the display interface 400 further provides a function for adjusting a precision threshold, i.e. an adjusting shaft 610. The more the adjusting shaft 610 is adjusted towards a precision threshold S, the smaller the value is, and it represents that the more strict a signal filtering condition is. A precision threshold M represents a medium signal filtering condition. The more the adjusting shaft 610 is adjusted towards a precision threshold L, the larger the value is, and it represents that the more loose the signal filtering condition is.

FIG. 6A illustrates a result of setting to the precision threshold M, and FIG. 6B illustrates a result of setting to the precision threshold L. In FIG. 6A, the matching module 135 obtains excellent reception regions 630_1 and 630_2 and a poor reception region 620 by using the precision threshold M. In FIG. 6B, the matching module 135 obtains an excellent reception region 630' and a poor reception region 620' by using the precision threshold L. According to FIG. 6A and FIG. 6B, it is known that compared to FIG. 6B, the precision threshold of FIG. 6A is smaller (the signal filtering condition is more strict), so that areas of the excellent reception regions 630_1 and 630_2 of FIG. 6A are smaller than an area of the excellent reception region 630' of FIG. 6B.

Regarding setting of the precision threshold, the precision threshold can be manually adjusted through the adjusting shaft 610 of FIG. 6A and FIG. 6B. Moreover, in other embodiments, the precision threshold can also be a predetermined value. For example, each pixel point on the electronic map MP has a corresponding DOP value, and the precision threshold is (the maximum DOP value+the minimum DOP value)×⅔.

Then, the LOS determination module 137 obtains the LOS region and the NLOS region of each of the beacons on the electronic map MP based on the obstruction information of the electronic map MP. The obstruction information includes a setting position of a wall or a separator, a setting position of a giant object, etc. Then, the matching module 135 obtains a plurality of overlapped regions according to the signal regions, the LOS regions and the NLOS regions respectively corresponding to each of the beacons on the electronic map MP. A signal level corresponding to each of the overlapped regions is set according to at least one of the signal regions, the LOS regions and the NLOS regions included in the overlapped regions. For example, overlapped regions with intersection are found in the signal regions, the LOS regions and the NLOS regions of each of the beacons. The overlapped regions include an intersection of a plurality of signal regions, an intersection of a plurality of LOS regions, an intersection of a plurality of NLOS regions, or an intersection of the signal region and the LOS region, etc.

Moreover, the level setting module 139 can be further used to set a signal level corresponding to each of the overlapped regions according to at least one of the signal regions, the LOS regions and the NLOS regions included in the overlapped regions. For example, if the overlapped regions include intersections of a plurality of signal regions and a plurality of LOS regions, the corresponding signal level thereof is set to be relatively high. If the overlapped region does not include the signal region of any beacon, the corresponding signal level thereof is set to the lowest.

In order to facilitate the user to view, the level setting module 139 displays a signal intensity distribution diagram according to the signal level, where the signal intensity distribution diagram is displayed in different colors according to the signal level of the pixels.

Figure 7:
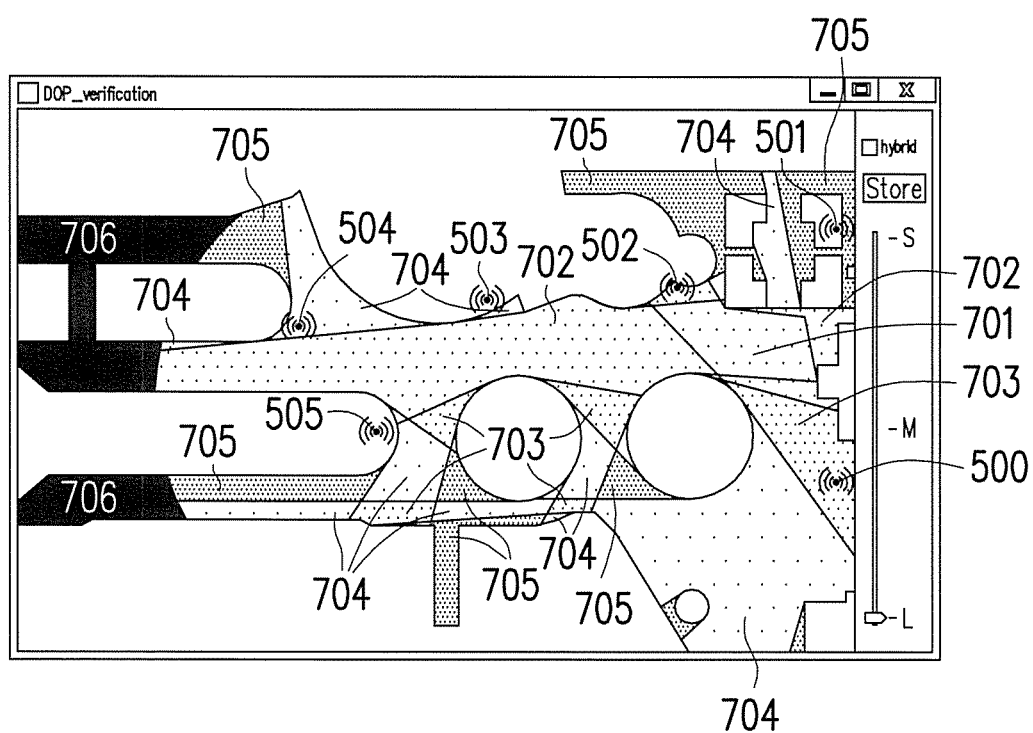
FIG. 7 is a schematic diagram of a signal intensity distribution based on DOP and line of sight (LOS) according to an embodiment of the invention.

FIG. 7 is a schematic diagram of the signal intensity distribution based on DOP and LOS according to an embodiment of the invention. Referring to FIG. 5, FIG. 6B and FIG. 7, in the present embodiment, a block 701 to a block 706 respectively represent blocks with the optimal signal intensity to the poorest signal intensity, and the block 706 is the poor reception region 620' of FIG. 6B.

Taking the block 701 as an example, it is assumed that the block 701 is located within corresponding signal regions of the beacons 500-503 on the electronic map MP, and the block 701 also includes the LOS regions of the beacons 500-503. Since the number of the signal regions and the LOS regions included in the block 701 is the highest among the blocks 701-706, the signal level of block 701 is the highest, i.e. a block with the optimal signal intensity. Deduced by analogy, the signal levels of the other blocks 702-705 can also be set accordingly.

Moreover, the display interface further has a resetting function, and when the resetting function is enabled, the matching module 135 resets the locations of the beacons, and the matching module 135, the LOS determination module 137 and the level setting module 139 are re-executed to re-obtain the corresponding signal level.

When the matching module 135 discovers that three or more beacons are set on a same straight line, the matching module 135 sends a warning message to notify the user to reset the locations of the beacons.

In other embodiments, the matching module 135 may also repeatedly and automatically set the location data of a plurality of beacons, and the steps S310-S325 are executed to obtain a plurality of signal intensity distributions under different layouts, and extract the optimal signal intensity distribution to obtain an optimal layout method of the beacons.

In summary, the signal intensity distribution of the beacons to be configured in a specific space can be pre-simulated to save a time required for carrying out multiple actual deployments. The user may obtain the signal intensity distribution according to the aforementioned embodiments. If the obtained signal intensity distribution is not ideal, the number of the beacons and/or the locations of the beacons can be reset in the display interface, so as to recalculate to obtain a new signal intensity distribution. After the ideal signal intensity distribution is obtained, the user may actually install the beacons in the specific space according to the obtained beacon configuration diagram.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A computer-implemented method for displaying a reception status of a plurality of beacons on an electronic map, wherein the electronic map comprising an indoor map, the computer-implemented method comprising following steps implemented by a computer processor:

loading and displaying the electronic map, wherein the electronic map has at least one obstruction information;

determining locations of the beacons respectively located on the electronic map to obtain a plurality of location data, wherein the beacons defines a geo-fence corresponding to the indoor map;

determining a plurality of signal regions corresponding to respective signal intensity ranges of the beacons on the electronic map based on the location data;

determining line of sight regions and non line of sight regions of the beacons respectively corresponding to the obstruction information on the electronic map based on the location data;

obtaining a signal intensity distribution within the geo-fence according to the signal regions, the line of sight regions and the non line of sight regions; and executing and displaying a cartographic drawing on the electronic map based on the signal regions, the line of sight regions, the non line of sight regions and the signal intensity distribution within the geo-fence wherein the step of executing the cartographic drawing based on the signal regions, the line of sight regions, the non line of sight regions and the signal intensity distribution within the geo-fence comprises:

obtaining one or a plurality of overlapped regions according to intersection parts of the signal regions, the line of sight regions and the non line of sight regions respectively corresponding to the beacons on the electronic map; and setting a signal level corresponding to each of the overlapped regions according to at least one of the signal regions, the line of sight regions and the non line of sight regions included in the overlapped regions, wherein the greater the number of the signal regions and number of the line of sight regions that are included in the overlapped region, the higher the corresponding signal level thereof is.

2. The computer-implemented method for displaying the reception status of the beacons on the electronic map as claimed in claim 1, wherein after the step of determining the signal regions corresponding to the respective signal intensity ranges of the beacons on the electronic map, the method further comprises:

adjusting a precision threshold to determine a precision of each of the signal regions.

3. The computer-implemented method for displaying the reception status of the beacons on the electronic map as claimed in claim 1, wherein the step of executing the cartographic drawing based on the signal regions, the line of sight regions, the non line of sight regions and the signal intensity distribution within the geo-fence comprises:

determining an intersection region between each corresponding the signal region and each corresponding the line of sight region to obtain an overlapped region.

4. The computer-implemented method for displaying the reception status of the beacons on the electronic map as claimed in claim 1, wherein after the step of setting the signal level corresponding to each of the overlapped regions, the method further comprises:

displaying a signal intensity distribution diagram according to the signal level, wherein the signal intensity distribution diagram is displayed in different colors based on the signal level.

5. The computer-implemented method for displaying the reception status of the beacons on the electronic map as claimed in claim 1, wherein the step of determining the line of sight region and the non line of sight region of the beacons respectively corresponding to the obstruction information on the electronic map based on the location data comprises:

determining whether at least one obstruction exists on a straight line transmission path of each of the beacons on the electronic map based on the obstruction information, so as to obtain the line of sight region and the non line of sight region of the each of beacons on the electronic map.

6. The computer-implemented method for displaying the reception status of the beacons on the electronic map as claimed in claim 1, further comprising:

providing a display interface, and loading and displaying the electronic map in the display interface; and displaying a device icon, an identification code and coordinate values corresponding to each of the beacons on the electronic map after the locations of the beacons on the electronic map are determined, wherein the display interface provides a dragging function and an input function, when the dragging function is triggered, a dragging operation is performed on the device icon according to a dragging command; the location data of the beacons are received through the input function, and the device icons corresponding to the respective beacons are displayed on the electronic map according to the location data.

7. The computer-implemented method for displaying the reception status of the beacons on the electronic map as claimed in claim 6, further comprising:

resetting the device icons of the beacons on the electronic map when a resetting function on the display interface is enabled, and re-determining a location of each of the beacons on the electronic map, so as to obtain the location information to re-execute the cartographic drawing.

* * * * *